(12) United States Patent
Adzima et al.

(10) Patent No.: US 7,648,733 B2
(45) Date of Patent: Jan. 19, 2010

(54) POWDER COATED ROVING FOR MAKING STRUCTURAL COMPOSITE

(75) Inventors: Leonard J. Adzima, Pickerington, OH (US); Michael A. Strait, Johnstown, OH (US); William G. Hager, Westerville, OH (US)

(73) Assignee: OCV Intellectual Capital, LLC DE (US)

( * ) Notice: Subject to any disclaimer, the term of this patent is extended or adjusted under 35 U.S.C. 154(b) by 702 days.

(21) Appl. No.: 10/858,692

(22) Filed: Jun. 2, 2004

(65) Prior Publication Data

US 2004/0241441 A1 Dec. 2, 2004

Related U.S. Application Data

(62) Division of application No. 09/935,267, filed on Aug. 22, 2001, now abandoned.

(60) Provisional application No. 60/295,707, filed on Jun. 4, 2001.

(51) Int. Cl.
*B05D 1/36* (2006.01)
*B29C 70/52* (2006.01)

(52) U.S. Cl. .................. 427/202; 427/180; 427/185; 427/195; 427/372.2; 427/430.1; 156/166; 156/180; 156/181; 264/145

(58) Field of Classification Search .............. 427/434.6, 427/195, 428, 385.5, 389.8, 185; 428/408, 428/902; 264/121, 131, 113; 425/113; 156/500, 156/244.1

See application file for complete search history.

(56) References Cited

U.S. PATENT DOCUMENTS

| | | | | |
|---|---|---|---|---|
| 4,614,678 A | * | 9/1986 | Ganga | 428/74 |
| 4,713,139 A | * | 12/1987 | Ganga | 156/500 |
| 4,948,574 A | * | 8/1990 | Sasaki et al. | 423/447.4 |
| 5,093,155 A | * | 3/1992 | Miyazaki et al. | 427/177 |
| 5,094,883 A | * | 3/1992 | Muzzy et al. | 427/185 |
| 5,171,630 A | * | 12/1992 | Muzzy et al. | 428/298.7 |

(Continued)

FOREIGN PATENT DOCUMENTS

WO  WO 96/28258  *  9/1996

OTHER PUBLICATIONS

K. L. Lowensteon "The Manufacturing Technology of Contuous Glass Fibers".

(Continued)

*Primary Examiner*—Jill Gray
(74) *Attorney, Agent, or Firm*—James J. Dottavio; Kathryn W. Grant

(57) ABSTRACT

A polymer composite multiend roving material used to make structural composite parts includes a bundle of fibers held together by a high integrity sizing composition and surrounded by a powder coating polymer material. The powder coating material is approximately 10-80% of the dry weight of the multiend composite roving weight. The multiend composite roving material may then be easily processed further to form a molded composite part having good mechanical properties and high fiber content.

28 Claims, 4 Drawing Sheets

U.S. PATENT DOCUMENTS

| | | | |
|---|---|---|---|
| 5,198,281 | A | 3/1993 | Muzzy et al. |
| 5,296,064 | A | 3/1994 | Muzzy et al. |
| 5,302,419 | A | 4/1994 | Muzzy |
| 5,380,477 | A * | 1/1995 | Kent et al. ............ 264/103 |
| 5,409,757 | A | 4/1995 | Muzzy et al. |
| 5,756,206 | A * | 5/1998 | Davies et al. ............ 428/367 |
| 5,789,329 | A | 8/1998 | Eastes et al. |
| 6,054,177 | A * | 4/2000 | Endoh et al. ............ 427/203 |
| 6,565,944 | B1 * | 5/2003 | Hartness et al. ............ 428/109 |
| 6,616,971 | B2 * | 9/2003 | Evans ............ 427/249.3 |
| 6,630,231 | B2 * | 10/2003 | Perez et al. ............ 428/297.4 |

OTHER PUBLICATIONS

Journal of Electrostatics "Electric Field Modeling for Electrostatic Powder ...".

* cited by examiner

| SAMPLE DESCRIPTION | Tensile Stress | Tensile Modulus | Flex Stress | Unnotch IZod | Notch Izod | Glass Content |
|---|---|---|---|---|---|---|
| | ksi | 10^6 psi | ksi | ftlb/in | ftlb/in | % |
| ME2000, SRIM pick-up box | 26 | 1.6 | 36 | 30 | 21 | 53 |
| "905 SMC" - 50% 905AB in VE | 26 | 2.1 | 41 | | 11 | 50 |
| Composite Roving, 70% glass | 38 | 2.7 | 61 | 48 | 34 | 69 |
| Composite Roving, 75% glass | 38 | 2.8 | 52 | 51 | 36 | 76 |

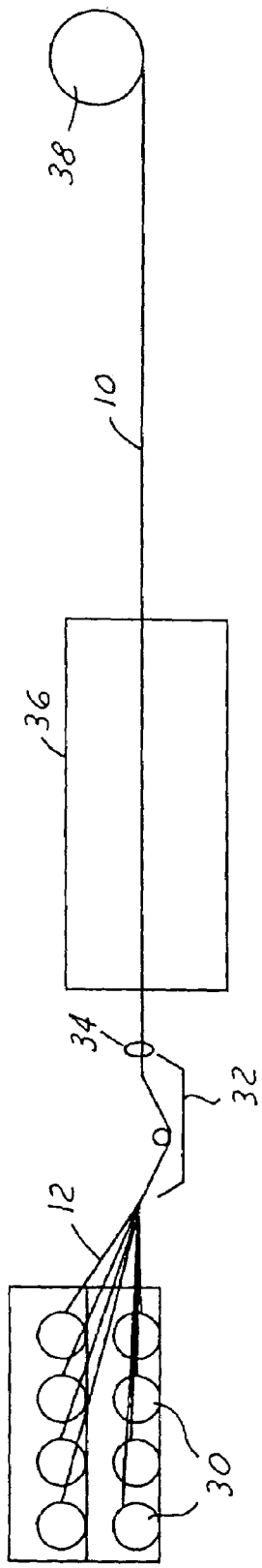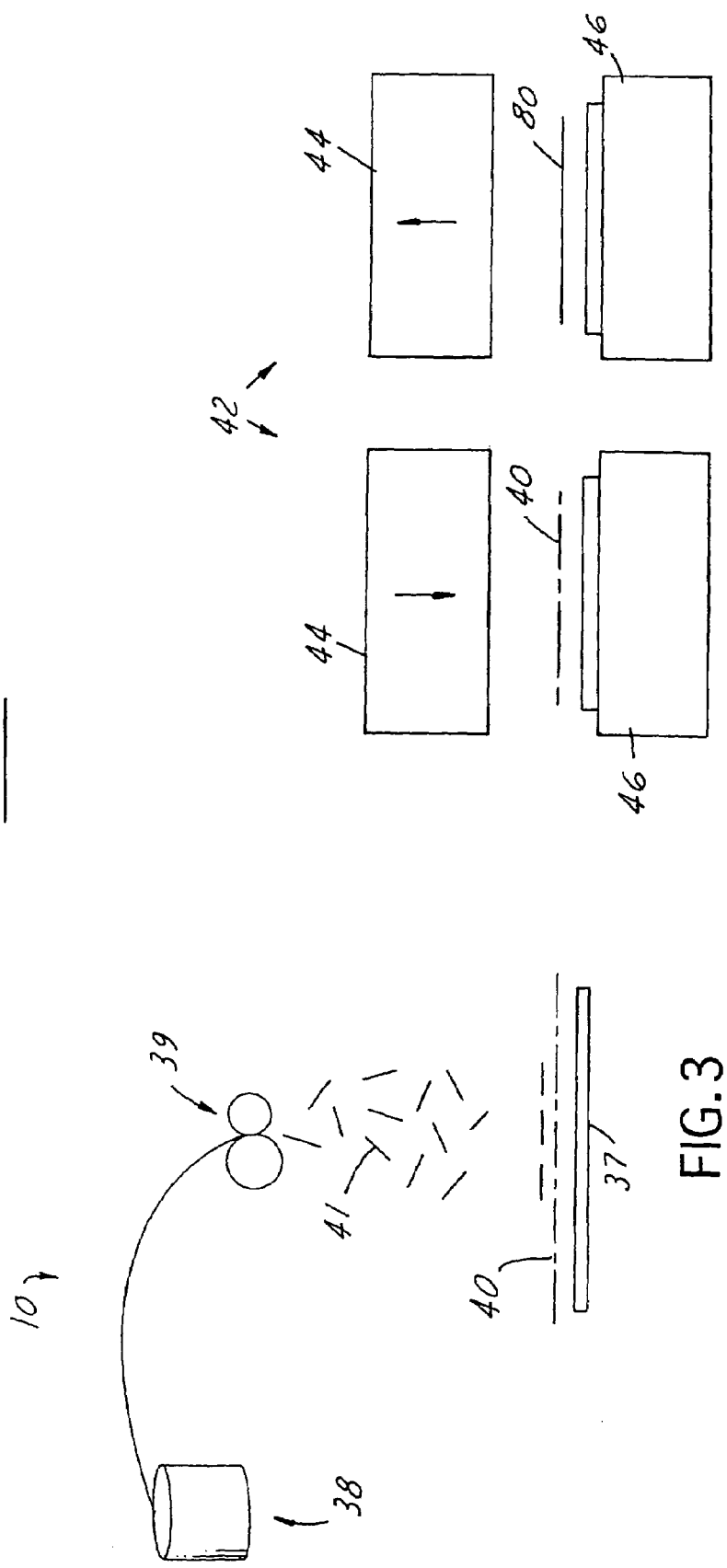

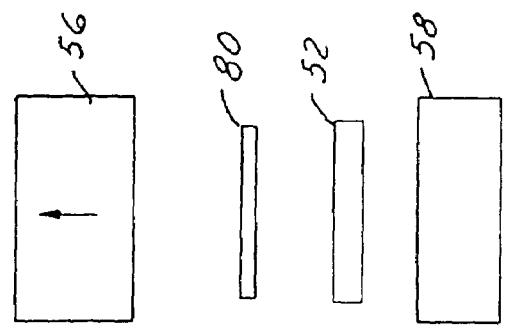
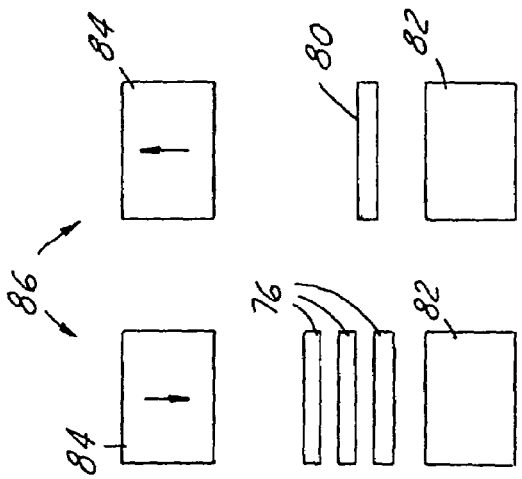
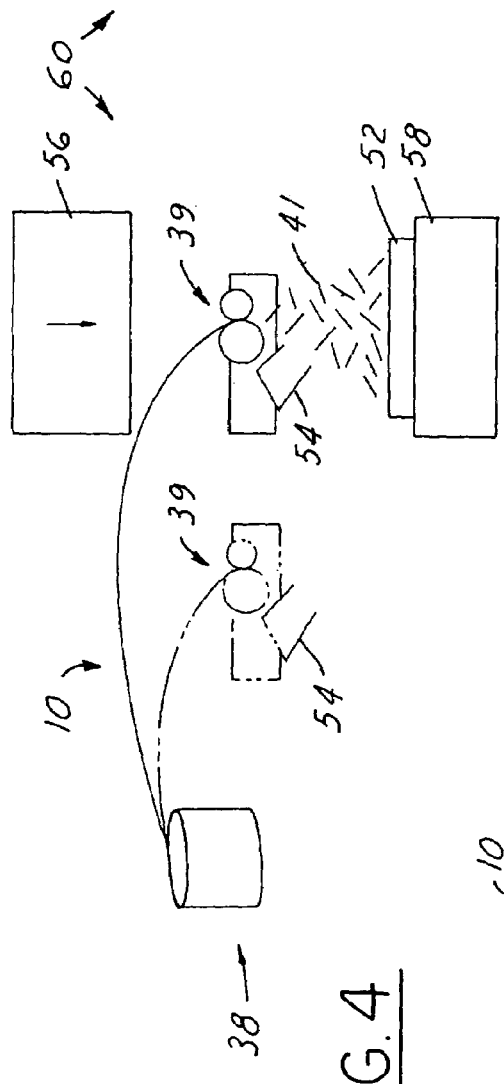
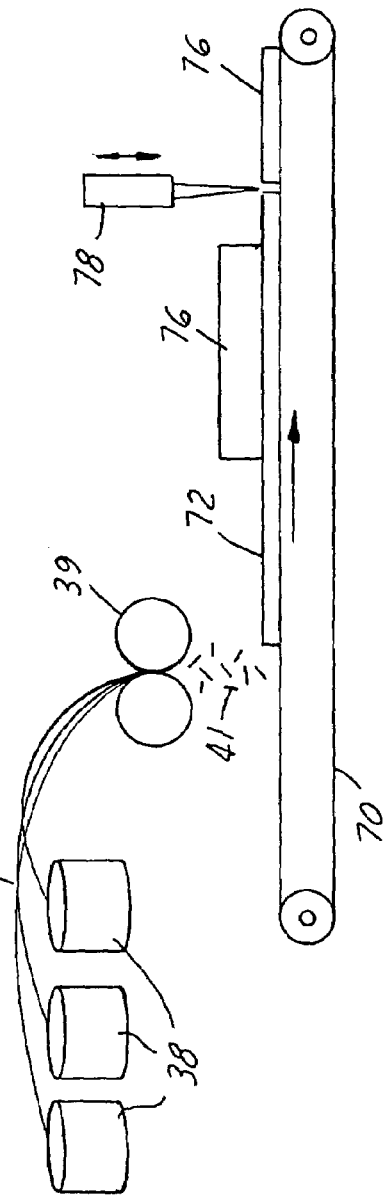
FIG. 4
FIG. 5

POWDER COATED ROVING FOR MAKING STRUCTURAL COMPOSITE

CROSS REFERENCE TO RELATED APPLICATION

The present application is a divisional of U.S. patent application Ser. No. 09/935,267, filed Aug. 22, 2001, which claims priority from provisional application Ser. No. 60/295,707, filed Jun. 4, 2001, which is hereby incorporated by reference in its entirely.

TECHNICAL FIELD AND INDUSTRIAL APPLICABILITY OF THE INVENTION

The present invention relates generally to structural composites and more specifically to powder coated rovings for making structural composites.

BACKGROUND OF THE INVENTION

Structural composites are well known and are used in a wide variety of applications that require plastic parts having a minimum threshold of mechanical properties such as strength and impact resistance while imparting cost savings in terms of manufacturing techniques and in terms of weight reduction. Examples of structural composites include sheet molding compound (SMC) and structural reaction injection molding (SRIM).

Structural composites are typically made by introducing glass fiber or other reinforcing material to a thermoplastic or thermosetting polymer material. The glass fiber and polymer material may be mixed together and formed into a composite part in a wide variety of methods, including compression molding and injection molding. Examples of structural composites include sheet molding compound (SMC) and structural reaction injection molding (SRIM).

Many problems exist with the technologies used to make structural composites and are inherent in the structural composites themselves. First, the thermoplastic or thermosetting polymer materials commonly used in these processes are typically solvent-based systems. As such, volatile organic content (VOC) may be released to the atmosphere as the part is cured. Second, the process used to make the material is very complicated, thus adding to the manufacturing costs. For example, in a typical SRIM process, the reinforcement materials and polymer resin are introduced individually to the molding equipment and the part is molded, which adds to the cost of manufacture. Third, in these types of equipment, composite parts having an inadequately dispersed reinforcement material in the part is possible if the machine is calibrated inappropriately. Finally, in injection molding processes, the amount of fiber content that may be loaded within the composite part is limited due to the process itself as is well known in the art. As polymer resins are typically more expensive than the reinforcement material, the cost of the composite part is correspondingly increased.

With regard to the VOC problem one potential polymer system that may be used is a powder coating system. Powder coating systems use aqueous slurries of polymer powder and water to introduce coatings to a part. Organic emissions are limited to additives that may help the polymer remain dispersed in the slurry and to help the resin flow during the curing step.

It is therefore highly desirable to provide a method for combining the powder coating industry and glass fiber industry for making structural composite parts. It is also desirable to increase the fiber content in structural composite parts to improve or maintain mechanical properties such as strength or impact resistance. It is also desirable to simplify the manufacturing of structural composite parts by introducing the polymer resin and fiber reinforcement material in one step to be molded to a desired shape.

SUMMARY OF THE INVENTION

It is thus an object of the present invention to combine the technologies of the powder coating and glass fiber industry to make a structural composite material having good mechanical properties, increased reinforcement content and simplified manufacturing techniques.

The above objects are accomplished by producing a unique powder coated composite roving material that is subsequently chopped, preformed, and introduced to a compression mold to form reinforced composite parts. A unique feature of the present invention is that the composite roving material is formed by introducing a powder coating to the outside fibers of a high integrity bundle of inorganic or organic fibers held together with a sizing composition. The powder coating is attached and partially melts around the outside fibers, leaving the internal fibers bundled together with the sizing composition.

The fiber reinforced composite parts have higher fiber content than is generally found in other fiber-reinforced composites due to the fact that the part may be formed from one source, as compared with traditional techniques such as injection molding which involve introducing the reinforcement material and polymer resin separately. Further, the mechanical properties are improved due to higher reinforcement content in the composite part. Further, raw material costs are reduced by introducing higher amounts of reinforcement material in the composite part. Finally, molding costs are lessened due to simplified molding techniques involving only the chopped powder-coated composite material as compared with separate introduction of the reinforcement fibers and polymer resin to an injection mold.

Other objects and advantages of the present invention will become apparent upon considering the following detailed description and appended claims, and upon reference to the accompanying drawings.

BRIEF DESCRIPTION OF THE DRAWINGS

FIG. 2 is a schematic diagram for making the composite roving of FIG. 1;

FIG. 3 is a schematic diagram of one preferred way for making a composite part from the composite roving of FIG. 1;

FIG. 4 is a schematic diagram of another preferred way for making a composite part from the composite roving material of FIGS. 1;

FIG. 5 is a schematic diagram of another preferred way for making a composite part from the composite roving material of FIG. 1;

DETAILED DESCRIPTION AND PREFERRED EMBODIMENTS OF THE INVENTION

Figures 1, 8:
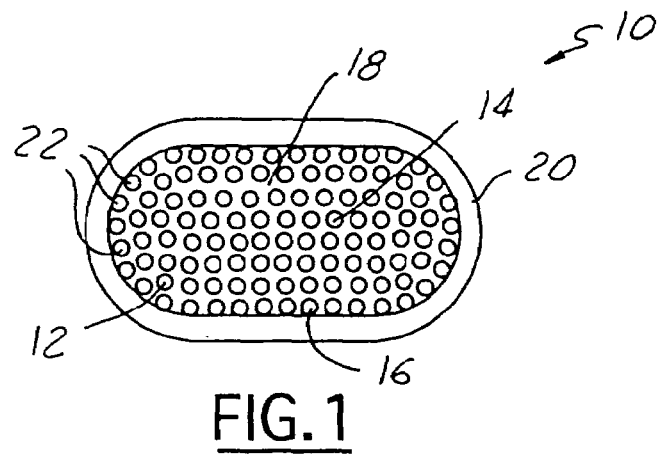
FIG. 1 is an end view of one strand of a composite roving material used to make a composite part according to a preferred embodiment of the present invention.
FIG. 8 depicts a table comparing various mechanical properties of composite parts having varying fiber contents according to the present invention with other traditionally available reinforced composite parts.

Referring now to FIG. 1, a powder coated composite multiend roving used for making a structural composite according to a preferred embodiment of the present invention is depicted as 10. The roving 10 is comprised of a bundle of fibers 12. The bundle of fibers 12 is comprised of a plurality of inner fibers 14 and a plurality of outer fibers 16 held together by a high integrity sizing composition 18. Preferably, the high integrity sizing composition comprises approximately 0.5 to 5% by weight of the total weight of the bundle of fibers 12. In addition, the bundle 12 contains between approximately 500 and 1100 filaments of inner fibers 14 and outer fibers 16 comprised of filaments that are approximately 8-16 microns in diameter. A powder coating polymer material 20 is introduced to the outer surfaces 22 of the outer fibers 16 such that the powder coating material substantially surrounds the bundle 12. Of course, some of the powder coating polymer material 20 enters within the bundle 12 during this introduction step. The powder coating material 20 is approximately 10-80% of the weight of the multiend composite roving 10 weight. The powder coating material 10 powder is approximately 1-100 microns in diameter, with preferred ranges equaling 5-10 microns in diameter. The process for making the multiend roving material 10 is shown below in FIG. 2. The multiend composite roving material 10 may then be processed further to form a molded composite part 80 as shown in FIG. 3 below.

In a preferred embodiment of the present invention, as shown in FIG. 1, the sizing composition 18 is approximately 1% by weight of the total weight of the bundle 12 of fibers and the fiber bundle 12 is approximately 12 microns in diameter and contains approximately 800 individual filament fibers 14, 16. Also, the powder-coating polymer material 20 preferably comprises approximately 20-30% of the weight of the composite roving 10.

Suitable fibers 14, 16 that may be used in the present invention should be thermally stable at the temperatures involved in the consolidation step to make the composite structure. In addition, the fibers 14, 16 must have glass transition and melting temperature greater than room temperature. These fibers 14, 16 that are used may thus be of many different types, including glass fibers, carbon and graphite fibers, organic fibers, aramid fibers, natural fibers, synthetic fibers, hybrid fibers and combinations thereof that are well known in the art. Preferably, e-type glass, s-type glass, or carbon fibers are used as the reinforcing material.

A high integrity sizing composition 18, by definition, maintains the individual fibers 14, 16 in a bundle 12 during processing. It therefore is not easy to filamentize the bundle 12 during processing. A low integrity sizing composition, by contrast, allows the bundle strands to easily filamentize. In the present invention, it is necessary to maintain the fibers 14, 16 in a bundle 12, thereby allowing only an outer surface 22 of the plurality of outer fibers 16 to be coated with the powder coating 20. During formation of the bundle, the bundle 12 is flattened out when wound on a tube that makes a forming cake (shown as 30 in FIG. 2). Accordingly, an end view of the flattened bundle 12 provides a generally elliptical cross section. The elliptical cross section provides for greater surface area of the bundle 12 that is exposed to the powder coating material 20. Of course, in other embodiments, the cross sectional shape may be round or irregularly shaped as opposed to generally elliptical.

The powder coating 20 that is used is made of a slurry or emulsion coating having a powdered polymer material. The powdered polymer material is a good wetting matrix resin that is capable of being applied as a dip coating at room temperature. The polymer powder coating material 20 should also be capable of melting, flowing, and curing when it is molded into a final composite part. Many different powdered polymers may be used, including polyesters, bisphenol type epoxies, novalac type epoxies, phenolics, acrylics, polyurethanes, hybrid polymers (for example, an epoxy polyester copolymer or a polyester triglycidylisocyanurate copolymer) and other thermoplastic or thermosetting polymers that exhibit good wetting and processability for making a structural composite part. In addition, the powder coating 20 may contain film formers that aid in attaching the powdered polymer material to the bundles 12. For example, polyurethanes may be used as film formers. Also, the powder coating 20 typically contains additives that aid in dispersing the powdered polymer material in the film former and water and in thickening the slurry to a desired thickness. One preferred powder coating slurry is shown below in Table 1.

TABLE 1

| NAME | DESCRIPTION | WEIGHT | SOLIDS |
| --- | --- | --- | --- |
| Blue 49/00340 (Tiger Drylac USA, Inc.) | Polyester-triglycidyl isocyanurate powder coating | 500 | 100% |
| Bayer Baybond PU403 | Polyurethane resin film former | 107 | 40% |
| Igepal CA-630 (Rhone-Poulenc) | Polyacrylamide Resin | 12 | 100% |
| DrewFloc (1%) (Ashland Chemical/Drew Industrial) | Thickener | 100 | 1% |
| Water | | 669 | |
| TOTALS | | 1388 | 40% |

Table 1 above shows one preferred composition of a powder coating 20 that is used to coat the bundle 12. The slurry is made by first mixing together the polyurethane, polyacrylamide, thickener, and water under agitation to form a premix. The powdered polymer material is then added slowly to premix material under agitation to produce the slurry bath having approximately 40% solids. The slurry bath is maintained under agitation during the application process to ensure that the powder polymer material remains evenly dispersed within the slurry bath.

FIG. 2 shows a schematic diagram for making the multiend composite roving 10 of FIG. 1. Individual sized bundled fibers 12 are unrolled from a plurality of forming cakes 30 and introduced through a slurry bath containing the powder coating polymer material 20 dispersed in a slurry or emulsion. The aqueous powder coated slurry is approximately 40% solids and is adhered mostly to the outer fibers 16 of the bundle 12 to form the composite roving material 10. A stripper die 34, is used the meter the amount of powder coating 20 on the coated bundle 12. The amount of powder coating material 20 metered onto the bundle 12 is controlled by varying the size of the orifice (not shown) in the stripper die 34. The coated bundle 12 is then sent through a drying oven 36 to remove water from the powder coating material 20. The drying oven 36 should be maintained at a temperature hot enough to remove the water from the powder coating 20 but cool enough to prevent the powder coating material 20 from significant melting. The dried composite roving 10 is then cooled and wound up onto a multiend roving package 38 for further processing.

In alternative embodiments, a squeegee (not shown) maybe used instead of or in conjunction with the stripper die 34 to meter the amount of powder coating 20 applied to the bundle 12. In addition, coated bundle 12 may simply be air dried as opposed to dried using a drying oven 36 as shown in FIG. 2.

Referring now to FIG. 3, a schematic diagram for making a composite part 80 from the composite roving material 10 is shown. The dried composite roving material 10 is unwound from the creel 38 and introduced to a chopper 39. The chopper 39 chops the composite roving material 10 onto a preform screen 37, thereby forming a preform 40 from the chopped composite roving material 41. A vacuum (not shown) may be used to ensure that the chopped roving material 41 falls onto the preform screen 39 in a manner consistent with the design of the composite part 80. The preform 40 is then heat consolidated to form a handleable preform. The handleable preform 40 containing the chopped roving material 41 is then placed in a heated press 42 and compression molded at a chosen pressure, preferably 300-1200 pounds per square inch, to form a composite part 80. The upper mold section 44 of the heated press 42 is maintained at an elevated temperature high enough to cause the powdered polymer coating 20 on the bundle 12 to melt, flow, and cure. Preferably, this elevated temperature is between 300 and 450 degrees Fahrenheit. During the curing process, the fiber bundles 12 flatten out as the high integrity sizing composition 18 melts slightly. This allows seepage of some of the powder coating material 20 within the inner fibers 14 and allows air removal from the composite part 80 to prevent the formation of voids, thereby giving the composite part 80 enhanced structural integrity. The upper mold section 44 and lower mold section 46 of the press 42 are held together a sufficient amount of time to ensure that the powder coated material 20 has completely reacted and to ensure that the fiber bundle 12 has compressed to its required thickness. The composite part 80 is then released from the mold 42 and cooled.

In an alternate preferred process, as depicted in FIG. 4, the composite roving material 10 is chopped in the presence of a hot air source device 54 which impacts the chopped composite roving material 41 as it leaves the chopping head of the chopper 39. The hot air source device 54 melts a portion of the powder coating material 20 on the powder coated roving material 10 to make them tacky without cure occurring. The tacky strands then impact a mold 52 with enough force and at sufficiently high temperature to keep the powder coating 20 warm without reversibly curing the powder coating material 20. Preferably, this is between 300 and 360 degrees Fahrenheit.

The chopper 39 is then removed and the mold 52 containing the chopped roving material 41 is placed in a press 60 and compression molded at a chosen pressure to form a composite part 80 as in FIG. 3. The upper mold section 56 of the press 60 is maintained at an elevated temperature high enough to cause the powdered polymer coating 20 on the bundle 12 to melt, flow, and cure. Preferably, this elevated temperature is between 300 and 450 degrees Fahrenheit. During the curing process, the fiber bundles 12 flatten out as the high integrity sizing composition 18 melts slightly. This allows seepage of some of the powder coating material 20 within the inner fibers 14 and allows air movement within the composite part 80, thereby giving the composite part 80 better flow characteristics and enhanced structural integrity. The upper mold section 56 and lower mold section 58 of the press 60 are held together a sufficient amount of time to ensure that the powder coated material 20 has completely reacted and to ensure that the fiber bundle 12 has compressed to its required thickness. The composite part 80 is then released from the mold 52 and press 60 and cooled.

Referring now to FIG. 5, another preferred method for making a composite part 80 from the composite roving material 10 is shown. The dried composite roving material 10 is unwound from the creel 38 and introduced to a chopper 39. The chopper 39 chops the composite roving material 10 and drops it onto a moving belt 70. The chopped roving material 41 is then compacted and heated in a press 74 to form a sheet 76. The sheet 76 is then cut to an appropriate size and shape using a chopping blade 78.

One or more layers of the sheet 76 may then be placed into a press 86 and compression molded at a chosen pressure to form a composite part 80. The upper mold section 84 of the press 86 is maintained at an elevated temperature high enough to cause the powdered polymer coating 20 on the bundle 12 to melt, flow, and cure. Preferably, this elevated temperature is between 300 and 450 degrees Fahrenheit. During the curing process, the fiber bundles 12 flatten out as the high integrity sizing composition 18 melts slightly. This allows seepage of some of the powder coating material 20 within the inner fibers 14 and allows air movement within the composite part 80, thereby giving the composite part 80 better flow characteristics and enhanced structural integrity. The upper mold section 84 and lower mold section 82 of the press 86 are held together a sufficient amount of time to ensure that the powder coated material 20 has completely reacted and to ensure that the fiber bundle 12 has compressed to its required thickness. The composite part 80 is then released from the press 86 and cooled.

Figure 6:
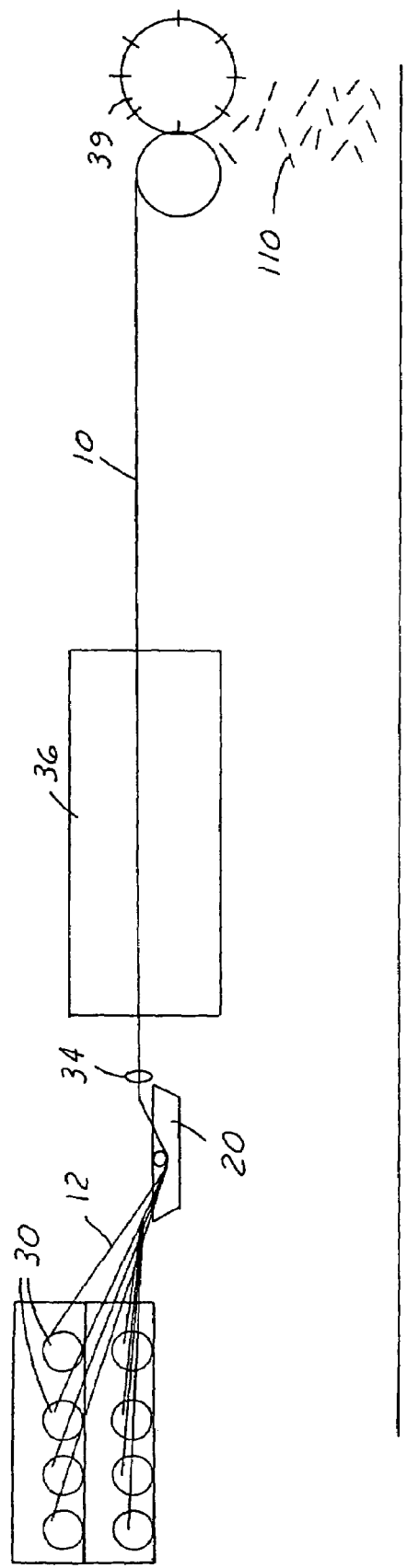
FIG. 6 is a schematic diagram for making moldable chop to be used to make a composite part from the composite roving of FIG. 1.

Referring now to FIG. 6, a schematic diagram for making a moldable chop 110 is shown. Individual sized bundled fibers 12 are unrolled from a plurality of forming cakes 30 and introduced through a slurry bath containing the powder coating polymer material 20 dispersed in a slurry or emulsion. The aqueous powder coated slurry is approximately 40% solids and is adhered mostly to the outer fibers 16 of the bundle 12 to form the composite roving material 10. A stripper die 34, is used the meter the amount of powder coating 20 on the coated bundle 12. The amount of powder coating material 20 metered onto the bundle 12 is controlled by varying the size of the orifice (not shown) in the stripper die 34. The coated bundle 12 is then sent through a drying oven 36 to remove water from the powder coating material 20 that forms the composite roving material 10. The drying oven 36 should be maintained at a temperature hot enough to remove the water from the powder coating 20 but cool enough to prevent the powder coating material 20 from significant melting. The composite roving material 10 is then chopped to approximately one-half inch moldable chop 110 in length using a chopper 39 and stored in a container (not shown).

The moldable chop 110, at approximately one-half inch, is similar to or smaller in size than the chopped composite roving material 41 of FIGS. 3-5. This allows the chop 110 to be easily poured from the container into a mold for compression molding. This forms a composite part 80 (not shown) having good reinforcing characteristics. Alternatively, the chop 110 could be layered onto the preform 40 as in FIG. 3 to form a molded composite part 80 having different lengthed fibers for different reinforcing applications.

Figure 7C:
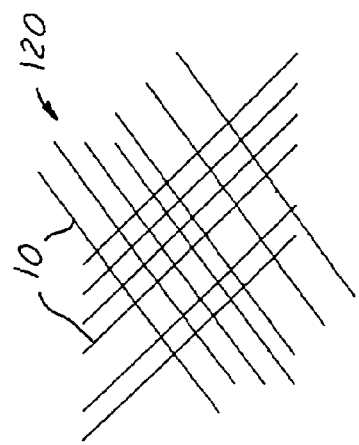
FIGS. 7A, 7B, and 7C illustrate weaving patterns that can be formed from the composite roving material of FIG. 1 that may be subsequently molded into a composite part.
Figure 7B:
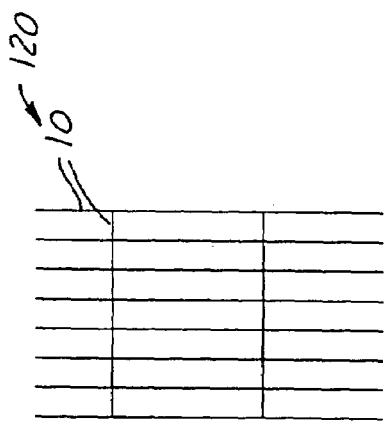
Figure 7A:
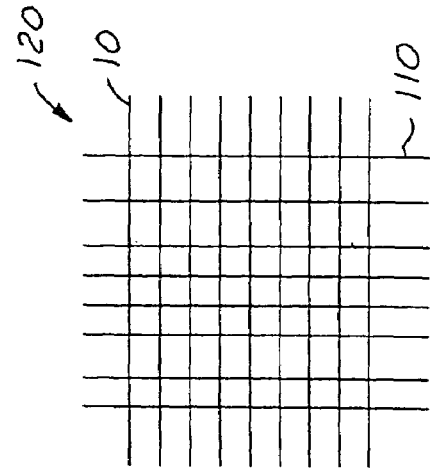

Referring now to FIGS. 7A, 7B, and 7C, the composite roving material 10 of FIG. 1 may be alternatively processed prior to a chopping steps as in FIGS. 3-6. Here, the composite roving material 10 may be woven, as shown in FIG. 7A, knitted, as described in FIG. 7B, or braided, as described in FIG. 7C, in a manner similar to what known in the fiberglass industry to form a fabric 120. One or more layers of the fabric 120 may then be placed in a mold and compression molded as described above in FIG. 3 to form composite parts 80 having unique reinforcing characteristics.

While some seepage of the powder coating material 20 into the plurality of inner fibers 14 may occur when compression molding the composite part 80 as in FIGS. 3-6, 7A-7C, most of the powder coating material 20 is maintained along the outer surface 22 of the outer fibers 16 around the bundle 12. This is an important aspect of the present invention, as this arrangement produces composite parts 80 having good mechanical properties including impact resistance.

FIG. 8 compares and contrasts mechanical properties of structural reaction injection molding ("SRIM"), sheet molding compound ("SMC"), 70% fiber composite part, and 75% fiber composite part according to the present invention. As seen in FIG. 8, the composite parts 80 of the present invention had improved tensile strength, tensile modulus, flex stress, and impact resistance (both notched and unnotched Izod) as compared with similar size and shaped SRIM and SMC composite parts. Further, the higher fiber content in the composite part improved tensile modulus, flex stress, and impact resistance as compared with the lower fiber content composite parts.

The present invention offers many advantages over typical structural composite materials in terms of mechanical properties, cost and processing. Many problems exist with the technologies used to make structural composites and inherent in the structural composites themselves. For example, the volatile organic content (VOC) that may be released to the atmosphere during the processing steps for the present invention is minimal.

Also, the composite parts 80 of the present invention offer good mechanical properties due to their high fiber 14, 16 content.

In addition, the process used to make the composite parts 80 is simple, thus minimizing the manufacturing costs as compared with other structural composites. For example, in a typical SRIM process, the reinforcement materials and polymer resin are introduced individually to the molding equipment and the part is molded, which adds to the cost of manufacture.

Also, because the powdered polymer material 20 is added in metered amounts to the outside of the fiber bundles 12, the composition of the final composite parts 80 is precisely controlled as compared with other structural composite systems, wherein the polymer resin material and fiber content are separately introduced into an injection mold or similar apparatus. This is important because the structural and mechanical properties of the composite parts 80 may be more precisely controlled from part to part.

Similarly, aesthetic properties of the composite parts 80 of the present invention may be more precisely controlled and enhanced. For example, dyes or colored powders may be added to the powder coating material 20 that may then be molded into the final composite part 80.

Additionally, problems inherent with processing and manufacturing composite parts with high fiber content are eliminated in the present invention. For example, as described above, it is difficult to introduce a high fiber content into an injection molding process. Therefore, the amount of fiber content that may be loaded within the composite part is controlled by the mechanical properties desired, not by the inherent problems with the process itself. As polymer resins are typically more expensive than the fiber reinforcement material, the cost of the composite part is correspondingly decreased as more fiber is introduced. Therefore, composite parts having fiber contents surpassing 70% or more may be realized.

Finally, cost savings both in terms of manufacturing costs and raw material costs are realized by the present invention.

While the invention has been described in terms of preferred embodiments, it will be understood, of course, that the invention is not limited thereto since modifications may be made by those skilled in the art, particularly in light of the foregoing teachings.

What is claimed is:

1. A method for forming a composite roving for use in structural composites comprising the steps of:
   forming a sized fiber bundle of a first type, said fibers forming said sized fiber bundle being sized with a sizing composition that maintains said fibers in said bundle;
   applying a first amount of an aqueous powder coating to an outer portion of said sized fiber bundle to form a coated fiber bundle; and
   drying said coated fiber bundle to remove water from said aqueous powder coating,
   wherein said sized fiber bundle comprises a plurality of inner fibers and a plurality of outer fibers held together by said sizing composition, and
   wherein only an outer surface of said plurality of outer fibers are coated with said powder coating.

2. The method of claim 1, wherein the step of applying a first amount of an aqueous powder coating comprises the steps of:
   dipping said sized fiber bundle into an aqueous slurry of a powder coating material; and
   metering the amount of said aqueous slurry applied to said sized fiber bundle to a first amount.

3. The method of claim 2, wherein the step of metering the amount of said aqueous slurry applied to said sized fiber bundle to a first amount comprises the step of metering the amount of said aqueous slurry applied to said sized fiber bundle to a first amount using a stripper die.

4. The method of claim 2, wherein the step of metering the amount of said aqueous slurry applied to said sized fiber bundle to a first amount comprises the step of metering the amount of said aqueous slurry applied to said sized fiber bundle to a first amount using a squeegee.

5. The method of claim 1, further comprising the steps of:
   chopping said composite roving into a plurality of chopped strands having a first length; and
   compression molding said plurality of chopped strands to a desired shape to form the structural composite part.

6. The method of claim 5, wherein the step of metering the amount of said aqueous slurry applied to said sized fiber bundle to a first amount comprises the step of metering the amount of said aqueous slurry applied to said sized fiber bundle to a first amount using a stripper die.

7. The method of claim 5, wherein the step of metering the amount of said aqueous slurry applied to said sized fiber bundle to a first amount comprises the step of metering the amount of said aqueous slurry applied to said sized fiber bundle to a first amount using a squeegee.

8. The method of claim 5, wherein the step of drying said coated fiber bundle to form a composite roving comprises the step of air-drying said coated fiber bundle to form a composite roving, wherein the weight of said plurality of inner fibers and said plurality of outer fibers within said composite roving after the drying step comprises between approximately ten and eighty percent of the total dry weight of said coated fiber bundle.

9. The method of claim 5, wherein the step of drying said coated fiber bundle to form a composite roving comprises the step of heating said coated fiber bundle in a drying oven to remove a quantity of water from said aqueous powder coating to form a composite roving, wherein the weight of said plurality of inner fibers and said plurality of outer fibers within said composite roving after the drying step comprises between approximately ten and eighty percent of the total dry weight of said coated fiber bundle.

10. The method of claim 5, wherein the step of drying said coated fiber bundle to form a composite roving comprises the step of air-drying said coated fiber bundle to remove a quantity of water from said aqueous powder coating to form a composite roving, wherein the weight of said plurality of inner fibers and said plurality of outer fibers within said composite roving after the air-drying step comprises between approximately ten and eighty percent of the total weight of said coated fiber bundle.

11. The method of claim 5, wherein the step of chopping said composite roving into a plurality of chopped strands comprising the steps of
chopping said composite roving in the presence of a hot air source device, wherein said hot air source device partially melts and tackified said powder coating material on said composite roving; and
impacting said composite roving on a mold surface with sufficiently high temperature to keep said powder coating material tackified without reversibly curing said powder coating material.

12. The method of claim 5, wherein the step of compression molding said plurality of chopped strands to a desired shape to form the structural composite part comprises the steps of:
placing said plurality of chopped stands onto a preforming screen to form a preform;
heat consolidating said preform to form a handleable perform;
placing said handleable preform between a lower mold section and an upper mold section of a press;
compressing said handleable preform between said lower mold section and said upper mold section of said press for a predetermined amount of time at a predetermined pressure and at a predetermined elevated temperature of said upper mold section sufficient to melt flow and cure a powder coating material contained within said composite roving to form the structural composite part; and
releasing the structural composite part from said press.

13. The method of claim 12, wherein said predetermined elevated temperature is between approximately 300 and 450 degrees Fahrenheit and said predetermined pressure is between approximately 300 and 1200 pounds per square inch.

14. The method of claim 5, wherein the step compression molding said plurality of chopped strands to a desired shape to form the structural composite part comprises the steps of:
placing said plurality of chopped stands onto a moving belt;
compacting and heating said plurality of chopped strands to form a perform;
cutting said preform to a desired size and shape;
placing at least one layer of said preform between a lower mold section and an upper mold section of a press;
compressing said preform between said lower mold section and said upper mold section of said press for a predetermined amount of time at a predetermined pressure and at a predetermined elevated temperature of said upper mold section sufficient to melt, flow and cure a powder coating material contained within said composite roving to form the structural composite part; and
releasing the structural composite part from said press.

15. The method of claim 14, wherein said predetermined elevated temperature is between approximately 300 and 450 degrees Fahrenheit and said predetermined pressure is between approximately 300 and 1200 pounds per square inch.

16. The method of claim 1, further comprising the steps of:
coupling a plurality of strands of said composite roving to form a fabric;
placing at least one layer of said fabric in a mold; and
compression molding said at least one layer of fabric at a predetermined temperature and a predetermined pressure to form the structural composite part,
wherein the weight of said plurality of inner fibers and said pluratilty of outer fibers within said coin composite roving corn rises between a approximately ten and eighty percent of the dry total weight of said coated fiber bundle.

17. The method of claim 16, wherein the step of coupling a plurality of strands of said composite roving to form a fabric comprises the step of weaving a plurality of strands of said composite roving to form a fabric.

18. The method of claim 16, wherein the step of coupling a plurality of strands of said composite roving to form a fabric comprises the step of knitting a plurality of strands of said composite roving to form a fabric.

19. The method of claim 16, wherein the step of coupling a plurality of strands of said composite roving to form a fabric comprises the step of braiding a plurality of strands of said composite roving to form a fabric.

20. The method of claim 1, wherein said first fiber type is selected from the group consisting of e-type glass, s-type glass, carbon fiber, aramid fibers, synthetic fibers, and natural fibers.

21. The method of claim 1, wherein the step of applying a first amount of an aqueous powder coating comprises the step of metering said coating between approximately ten and eighty percent by weight of the dry total weight the composite roving.

22. The method of claim 1, wherein the step of applying a first amount of an aqueous powder coating comprises the step of metering said coating between approximately twenty and thirty percent by weight of the dry total weight the composite roving.

23. The method of claim 1, wherein the step of applying said powder coating comprises the step of applying a powder coating selected from the group consisting of a polyester powder coating, a bisphenol-type epoxy powder coating, a novalac epoxy powder coating, a phenolic powder coating, a hybrid epoxy and polyester powder coating, a polyurethane powder coating, and an acrylic powder coating.

24. The method of claim 1, wherein the step of applying said powder coating comprises the step of applying a thermoplastic powder coating.

25. The method of claim 1, wherein said aqueous powder coating comprises a powdered polymer, water and one or more members selected from a film former and a thickener.

26. A method for forming a composite roving package for use in structural composites comprising:
forming a coated fiber bundle, said bundle being formed of a plurality of inner fibers and a plurality of outer fibers surrounding said inner fibers, said inner and outer fibers being held together by a size composition that maintains said inner and outer fibers in said bundle during subsequent processing;

applying a first amount of an aqueous powder coating to an outer portion of said sized fiber bundle to form a coated fiber bundle;

drying said coated fiber bundle to remove water from said aqueous powder coating and form a dried composite roving;

cooling said dried composite roving; and winding said cooled composite roving into a roving package.

27. The method of claim 26, wherein said aqueous powder coating comprises a powdered polymer, water, and at least one member selected from a film former and thickener.

28. A method for forming a composite roving for use in structural composites comprising the steps of:

forming a sized fiber bundle, said bundle being formed of a plurality of inner fibers and a plurality of outer fibers surrounding said inner fibers, said inner and outer fibers being held together by a size composition that maintains said inner and outer fibers in said bundle during subsequent processing;

applying a first amount of an aqueous powder coating including a water, one or more powdered polymer, and at least one member selected from a film former and a thickener to an outer portion of said outer fibers to form a coated fiber bundle, said aqueous powder coating substantially surrounding said fiber bundle; and drying said coated fiber bundle to remove water from said aqueous powder coating.

* * * * *

UNITED STATES PATENT AND TRADEMARK OFFICE
CERTIFICATE OF CORRECTION

PATENT NO. : 7,648,733 B2  Page 1 of 1
APPLICATION NO. : 10/858692
DATED : January 19, 2010
INVENTOR(S) : Adzima et al.

It is certified that error appears in the above-identified patent and that said Letters Patent is hereby corrected as shown below:

Col. 10, lines 16 and 17 should read as follows:

...~~pluratilty~~ [plurality] of outer fibers within said ~~coin~~ composite roving ~~corn rises~~ [comprises] between ~~a~~ approximately...

Signed and Sealed this

Sixth Day of April, 2010

David J. Kappos
*Director of the United States Patent and Trademark Office*